United States Patent [19]

Mandon

[11] Patent Number: 5,746,861
[45] Date of Patent: May 5, 1998

[54] METHOD OF MANUFACTURING A STRUCTURAL PORTION OF A CONSTRUCTION MACHINE

[75] Inventor: Stephane L. Mandon, LaMurette, France

[73] Assignee: Caterpillar Inc., Peoria, Ill.

[21] Appl. No.: 706,622

[22] Filed: Sep. 6, 1996

[51] Int. Cl.$^6$ .................. B32B 15/00; B32B 1/00
[52] U.S. Cl. .............. 156/182; 156/304.1; 156/330; 403/188; 414/680
[58] Field of Search ................ 156/91, 182, 297, 156/304.1, 304.2, 330, 304.5; 29/DIG. 48; 228/177; 403/188; 414/680, 685, 697, 703, 715

[56] References Cited

U.S. PATENT DOCUMENTS

| | | | |
|---|---|---|---|
| 1,970,965 | 8/1934 | Leake | 403/188 |
| 3,902,295 | 9/1975 | Yancey | 414/715 |
| 4,135,414 | 1/1979 | Haug et al. | 76/115 |
| 4,392,314 | 7/1983 | Albrecht et al. | 414/694 |
| 4,428,867 | 1/1984 | Billias et al. | 252/512 |
| 4,448,847 | 5/1984 | Bell et al. | 428/413 |
| 4,561,670 | 12/1985 | Tokada | 280/281.1 |
| 4,562,892 | 1/1986 | Ecer | 175/371 |
| 4,643,792 | 2/1987 | Vezirian | 156/294 |
| 4,753,706 | 6/1988 | Verzirian | 156/294 |
| 4,855,001 | 8/1989 | Damico et al. | 156/307.3 |
| 4,968,383 | 11/1990 | Volkmann et al. | 156/643 |
| 5,282,566 | 2/1994 | Lammers et al. | 228/161 |
| 5,629,380 | 5/1997 | Baldwin et al. | 525/113 |
| 5,647,126 | 7/1997 | Wei | 29/894.322 |

OTHER PUBLICATIONS

Wake, William. *Adhesion and the Formulation of Adhesives*, Second Edition. 198. 2 p. 225.
Shields, J. *Adhesives Handbook*. 1970. p. 8.
Oberg, Erik et al. *Machinery's Handbook: A Reference for the Mechanical Engineer, Draftsman, Toolmaker and Machinist*. 1981. pp. 2344-2344.

Lee, Henry et al. *Epoxy Resins*. 1957. pp. 221-222.

*Primary Examiner*—Michael W. Ball
*Assistant Examiner*—Michael A. Tolin
*Attorney, Agent, or Firm*—Diana L. Charlton

[57] ABSTRACT

Past assemblies for structural portions of construction machines utilized advanced fixturing devices and welding to join the components. The fixturing devices are expensive and, if not used, distortional problems from the welding may reduce the quality of the asssemblies. The present invention overcomes this and other problems by providing a method of bonding a lift arm assembly. A pair of crossmember plates are connected at opposite ends of a crossmember to define a first modular component. A pair of lift arm assemblies define second and third modular components, respectively. A first contact surface is prepared by establishing a specific surface texture in a predetermined contact area on an outer surface of each of the crossmember plates. A second contact surface is prepared by establishing a specific surface texture in a predetermined contact area on an outer surface of each of the lift arm assemblies. The first modular component is bonded to the second and the third modular component at the first and second contact surfaces to define a pair of joints 45,46 capable of withstanding high forces approaching 2000000N (225 tons). The bonding of the modular components eliminate the major welding requirements for typical structure and avoid potential welding concerns.

7 Claims, 3 Drawing Sheets

METHOD OF MANUFACTURING A STRUCTURAL PORTION OF A CONSTRUCTION MACHINE

TECHNICAL FIELD

This invention relates generally to structural components bonded to withstand high forces on the order of 2000000 N (225 tons) without failure and more particularly to bonding such structural components within a construction machine.

BACKGROUND ART

Lift arm assemblies for construction machines carry large structural loads and experience high forces and residual stresses during either assembly or operation. Generally, these lift arm assemblies are assembled by either one of two techniques. The first technique includes holding the entire assembly within a machining complex or advanced fixturing device and welding the components together. This technique produces high quality assemblies at very high costs. The second technique, which is less costly, includes welding the components separately. Unfortunately, this technique may produce alignment problems due to the distortion of the components during welding. In order to achieve high quality lift arm assemblies at relatively low costs, a method of assembling structural components must be established which eliminates the distortion, residual stresses and advanced fixturing devices. Assembling components through bonding has been used to overcome some of these concerns.

An adhesive for bonding two members to withstand structural loads is disclosed in U.S. Pat. No. 4,428,867 issued to Michael G. Billias et. al. on Jan. 31, 1984. This prior art design includes a conductive adhesive used in a skin panel of an aircraft component housing an integral fuel tank and serves to conduct lightning strike currents away from the fuel tank. Additionally, the adhesive bond is described as withstanding structural loads of up to about 5000 pounds per square inch. This type of adhesive is mainly utilized to conduct electrical currents. The adhesive is not used to avoid manufacturing distortion caused by welding or the like. Additionally, these members are not assembled to withstand high shear forces.

The present invention is directed to overcoming the problems as set forth above.

DISCLOSURE OF THE INVENTION

In one aspect of the present invention, a method of manufacturing a structural portion of a construction machine is disclosed. This method comprises assembling a first structural member to define a first modular component. Next, assembling a second structural member to define a second modular component. Then, machining the second modular component within a plurality of predetermined dimensional characteristics. Finally, bonding the first modular component at a first end to the second modular component to define a joint capable of withstanding a total force greater than 2000000N in shear stress.

In another aspect of the present invention, a method of bonding a crossmember of a lift arm assembly for a construction machine to a pair of lift arm plates is disclosed. The method of bonding includes forming the crossmember with planar first and second end portions. Next, texturizing a predetermined outer surface area of the first and the second end portions of the crossmember. Then, texturizing a predetermined outer surface area of each of the pair of lift arm plates. Then, applying an adhesive to the textured outer surface of the first and the second end portions of the crossmember. Finally, bonding the first end portion to one of the pair of lift arm plates and the second end portion to the other of the pair of lift arm plates at the respective predetermined areas.

The present invention, utilizes an adhesive for bonding structural portions of construction machines which are capable of withstanding structural loads in excess of 2000000N (225 tons). The utilization of the adhesive eliminates the cost and alignment problems encountered with present manufacturing processes.

BEST MODE FOR CARRYING OUT THE INVENTION

Figure 1:
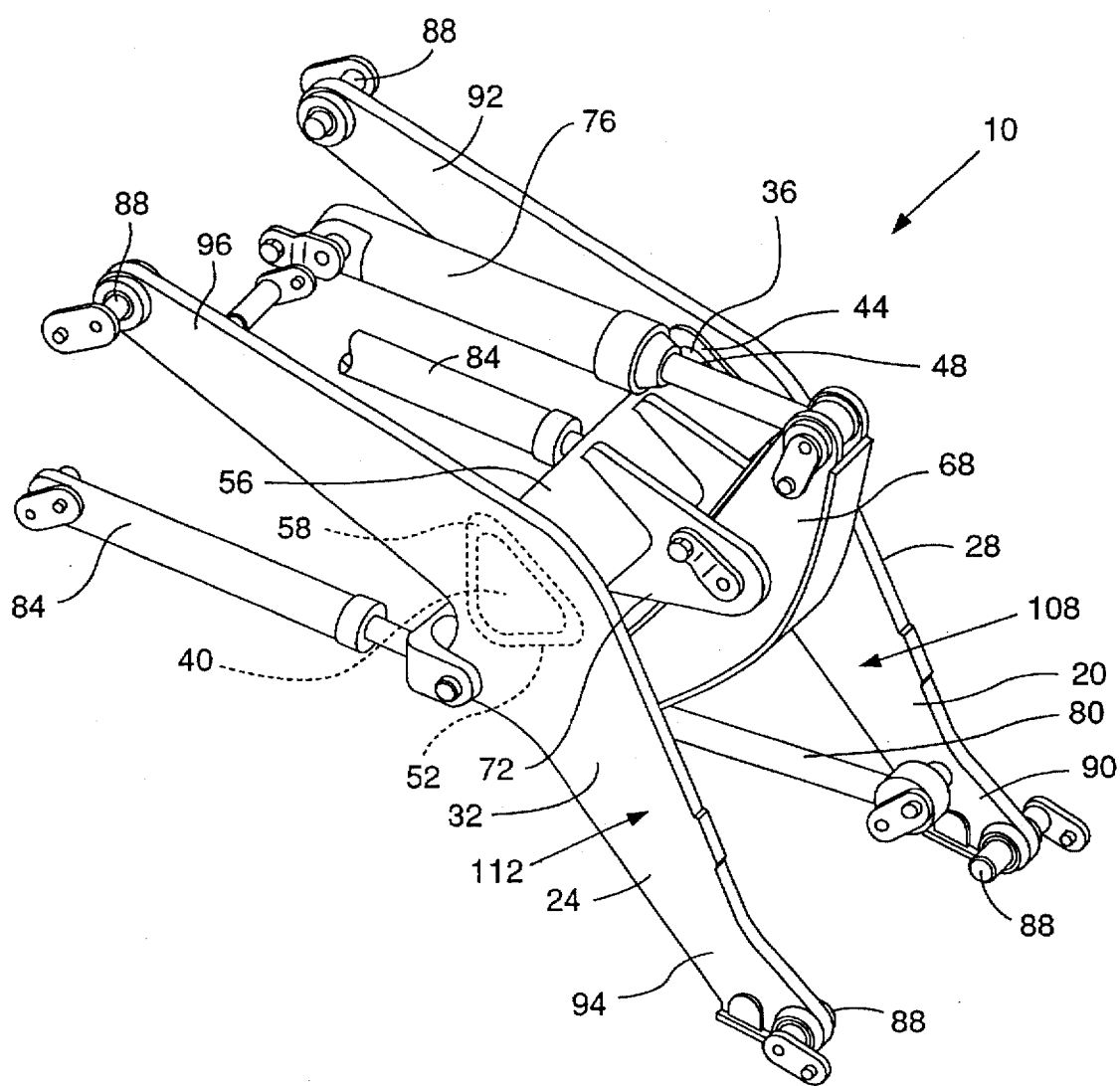
FIG. 1 is a diagrammatic view of a lift arm assembly embodying the present invention.

A structural portion, such as a lift arm assembly 10, of a construction machine (not shown) having a frame (not shown) and a total weight approaching 2000000N (225 tons) is illustrated in FIG. 1. The lift arm assembly 10 includes a pair of lift arm plates 20,24 each having an outer surface 28,32, respectively, and each being pivotally connected to the frame (not shown) in any suitable manner. A cylindrical crossmember 36 with an outer surface 40 extends between the pair of lift arm plates 20,24 and attaches to one of the pair of plates 20 at a first crossmember plate 44 on a first end portion 48 and attaches to the other of the pair of plates 24 at a second crossmember plate 52 on a second end portion 56. The first and second crossmember plates 44,52 each have a planar outer surface 58 with a flatness of approximately 0.2 mm (0.008 in) and a chamfered edge portion 59 machined at a predetermined angle of 10 degrees. A pair of joints 60,64 are formed at the intersection between the planar outer surface 58 and the lift arm plates 20,24. A tilt lever 68 is connected to the crossmember 36 through a pair of centrally located connecting ears 72 by any suitable method, such as welding. A tilt cylinder 76 is pivotally connected to the frame (not shown) at an end and to the tilt lever 68 at an opposite end. A tilt link 80 is pivotally connected at an end to the tilt lever 68 and to a bucket (not shown) at an opposite end. The tilt cylinder 76, tilt lever 68, and tilt link 80 are operatively associated to direct a bucket (not shown) in a specific operational motion. A lift cylinder 84 is pivotally connected to each of the lift arm plates 20,24 at a substantially central location at one end and to the frame (not shown) at an opposite end. The lift cylinders 84 are operatively associated with the lift arm plates 20,24 to direct the bucket (not shown) in a specific operational motion. A pin joint assembly 88 is connected at a first and a second end portion 90,92,94,96, respectively, of the lift arm plates 20,24.

A method 100 of manufacturing the lift arm assembly 10 of a construction machine (not shown) initially includes welding the pair of connecting ears 72 and first and second crossmember plates 44,52 onto the crossmember 36 to define a first modular component 104. Next, the pin joint assemblies 88 are connected to the first and second end portions 90,92,94,96 of the lift arm plates 20,24, respectively. The connection of the pin joint assemblies 88 to the lift arm plates 20,24 defines a second and a third modular component 108,112. Next, the second and third modular components 108,112 are machined to achieve a plurality of predetermined dimensional characteristics dependent on the size of the construction machine. Next, each of the planar outer surfaces 58 of the crossmember plates 44,52 are cleaned and texturized in any suitable manner at a first predetermined contact surface 116. The lift arm plates 20,24 are also cleaned and texturized in any suitable manner at a second predetermined contact surface 120. The first modular component 104 is fixedly positioned within a clamping fixture (not shown) of any suitable type. The second and third modular component 108,112 are fixedly positioned within the clamping fixture (not shown) so that the first and second contact surfaces 116,120 are adjacent each other.

Figure 2:
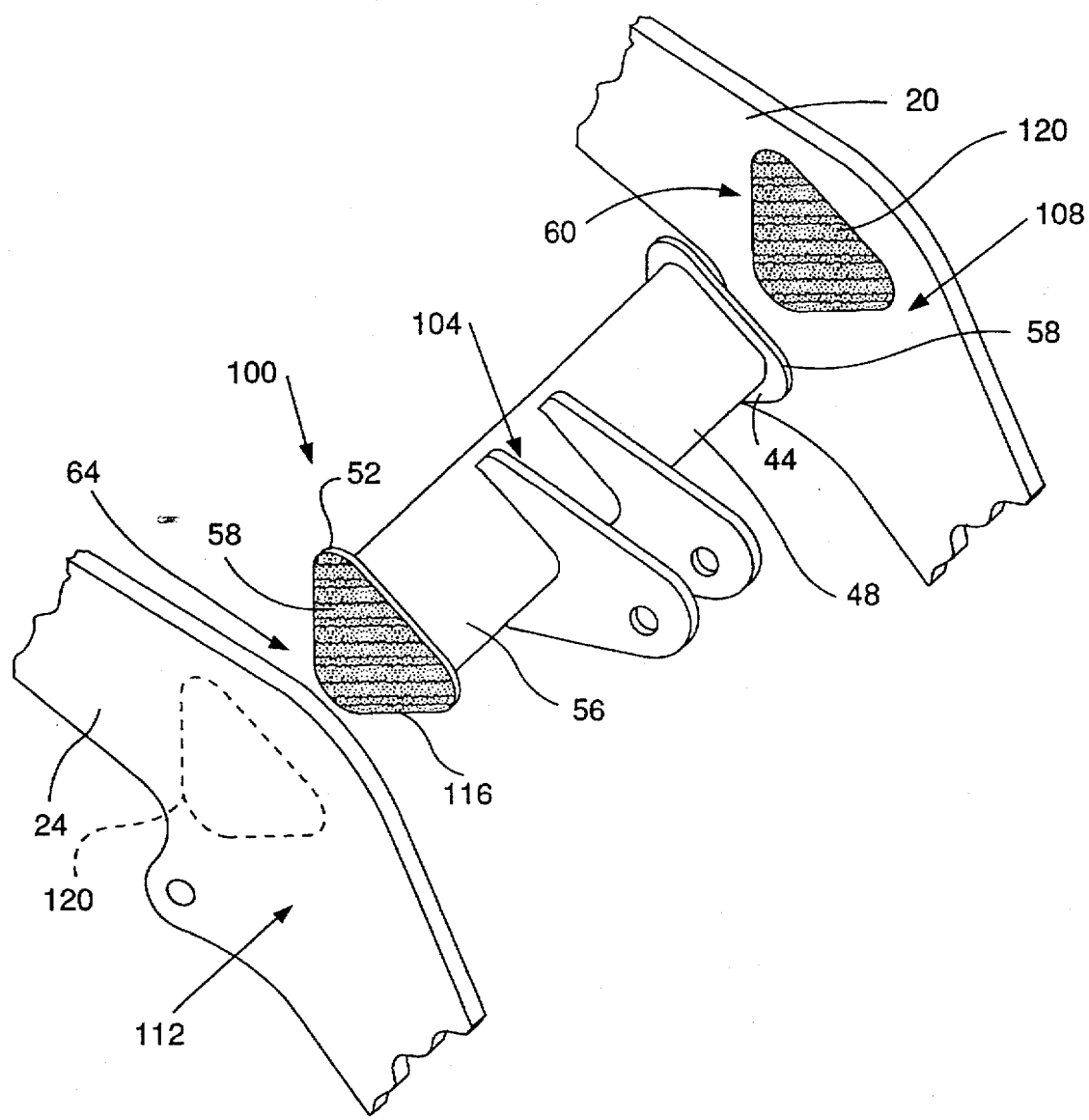
FIG. 2 is a diagrammatic view of the lift arm assembly prior to assembly.
Figure 3:
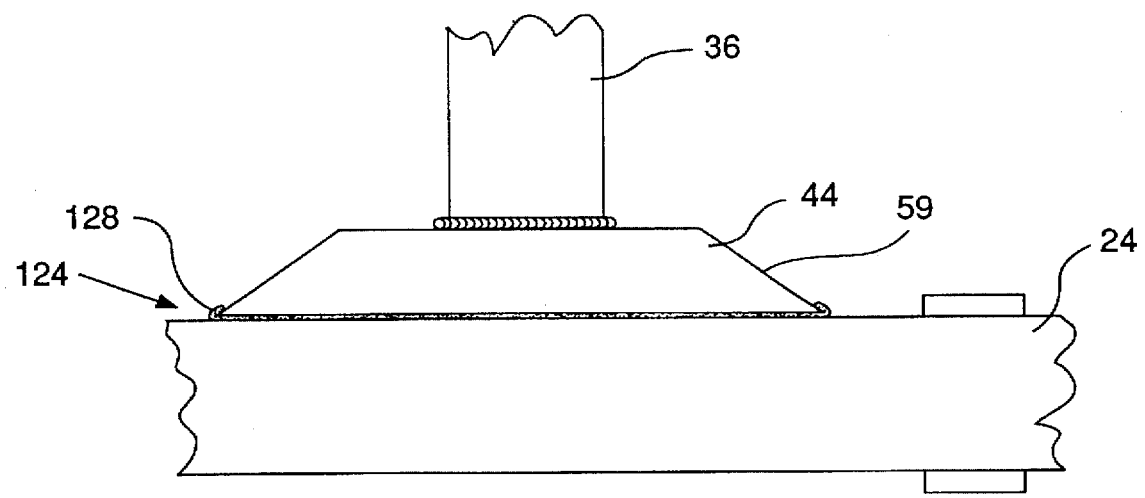
FIG. 3 is a diagrammatic elevated view of a bonded joint within the present invention.

A method 124 of bonding the first modular component 104 to the second and third modular component 108,112 can be seen more clearly in FIGS. 2 and 3. A bonding agent 128, such as a bicomponent epoxy having a contact pressure of approximately 0.2 to 0.5 bar and a well-known polymerization of 24 to 36 hours, is applied to the joint 60,64 in 0.4 mm (0.016 in) beads. Additionally, the bonding agent 128 is applied so that a portion thereof extends beyond the joints 60,64 and overlaps the chamfered edge portion 59. It should be understood that the specific application of the bonding agent 128 must achieve a constant 0.4 mm (0.016 in) thickness across the contact surfaces 116,120. The bonding agent 128 must have a strength capability which is able to withstand a total force greater than 2000000N (225 tons) or 25 MPa (3625 psi) in shear stress. The bonding agent must have high durability in temperature ranges between −55° C. and 80° C.

Industrial Applicability

In order to bond the crossmember 36 to the lift arm plates 20,24 in a manner which is sufficient to withstand structural loads exceeding 2000000 N (225 tons), the area of the contact surfaces 116,120 for application of the adhesive must be determined. The predetermined contact surface area 116,120, which must be located substantially at the joints 60,64 and be as large as possible, is calculated in a well-known manner given the structural loads and allowable shear stress of the bonding agent 128. Surface preparation for the calculated contact surface area 116,120 of the outer surface 28,32,58 of the lift arm plates 20,24 and the crossmember plates 44,52, respectively, increases the efficiency of the adhesive bond. The surface preparation includes "roughening" the outer surface area by any suitable method, such as sand blasting, grinding, filing, etc. to achieve an adequate surface texture.

The clamping fixture (not shown) is adjusted in a conventional manner, so that the first modular component 104 abuts the second and third modular component 108,112 at the contact surfaces 116,120. A force is applied by the clamping fixture (not shown) to provide pressure on the joints 60,64 during the bonding process.

In view of the above, the use of a bonding agent on structural components of a construction machine virtually eliminates welding thereof which decreases manufacturing time and related distortional concerns.

I claim:

1. A method of manufacturing a structural portion of a construction machine, comprising the steps of:

assembling a first structural member to define a first modular component including welding a first plate at a first end of the first structural member;

assembling a second structural member to define a second modular component;

machining the second modular component within a plurality of predetermined dimensional characteristics; and bonding the first modular component at the first end to the second modular component by applying an adhesive to the first plate to define a joint capable of withstanding a total force greater than 2000000N in shear stress.

2. The method of manufacturing a structural portion of a construction machine of claims 1, including the steps of:

welding a second plate at a second end of the first structural member;

assembling a third structural member to define a third modular component;

machining the third modular component within a plurality of predetermined dimensional characteristics; and simultaneously bonding the first modular component at the second end to the third modular component by applying an adhesive to the second plate to define another joint capable of withstanding a total force greater than 2000000N in shear stress.

3. The method of manufacturing a structural portion of a construction machine of claim 2, including the step of:

bonding the first modular component to the second and third modular component with an adhesive epoxy.

4. The method of manufacturing a structural portion of a construction machine of claim 3, wherein the step of assembling the first structural member includes the step of:

forming the first and second plates with an edge portion having a predetermined angle.

5. The method of manufacturing a structural portion of a construction machine of claim 4, wherein the step of bonding the first modular component to the second and third modular component includes the step of:

applying the epoxy at an outer surface of the first and second plates and extending the application beyond the joints defined between the first and the second modular components and the first and the third modular components.

6. A method of bonding a crossmember of a lift arm assembly for a construction machine to a pair of lift arm plates, comprising the steps of:

providing the crossmember with planar first and second end portions;

welding first and second plates at the respective first and second end portions of the crossmember;

texturizing a predetermined outer surface area of the first and the second plates of the crossmember;

texturizing a predetermined outer surface area of each of the pair of lift arm plates adjacent the texturized predetermined outer surface of the first and the second plates; and applying an adhesive to the texturized outer surface of the first and second plates for adherence to the respective texturized outer surface area of each of the pair of lift arm plates to define a pair of joints capable of withstanding a total force greater than 2000000N in shear stress.

7. The method of bonding the crossmember of the lift arm assembly of claim 6, including the step of:

utilizing a bicomponent epoxy as the adhesive.

* * * * *